(12) United States Patent
Gardner et al.

(10) Patent No.: US 11,130,905 B2
(45) Date of Patent: **\*Sep. 28, 2021**

(54) AMINATED DEXTRIN COMPOUNDS AND SUBTERRANEAN TREATMENT METHODS USING THE SAME

(71) Applicant: Integrity Bio-Chemicals, LLC, Cresson, TX (US)

(72) Inventors: Christopher P. Gardner, Cresson, TX (US); Kristopher Megahan, Grand Prairie, TX (US); Curtis J. Rodencal, Cresson, TX (US); Charles R. Landis, The Woodlands, TX (US); Ashoka V. R. Madduri, Belmont, MA (US)

(73) Assignee: Integrity Bio-Chemicals, LLC, Cresson, TX (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/482,524

(22) PCT Filed: Jul. 11, 2019

(86) PCT No.: PCT/US2019/041346
§ 371 (c)(1),
(2) Date: Jul. 31, 2019

(87) PCT Pub. No.: WO2020/014442
PCT Pub. Date: Jan. 16, 2020

(65) Prior Publication Data
US 2020/0017755 A1 Jan. 16, 2020

Related U.S. Application Data

(60) Provisional application No. 62/697,452, filed on Jul. 13, 2019.

(51) Int. Cl.
| | | |
|---|---|---|
| *C09K 8/575* | (2006.01) | |
| *E21B 33/13* | (2006.01) | |
| *C08B 37/00* | (2006.01) | |

(52) U.S. Cl.
CPC ........ *C09K 8/5758* (2013.01); *C08B 37/0087* (2013.01); *E21B 33/13* (2013.01); *C09K 2208/12* (2013.01)

(58) Field of Classification Search
CPC ........ C09K 8/08; C09K 8/206; C09K 8/5758; C09K 2208/12; E21B 43/25
See application file for complete search history.

(56) References Cited

U.S. PATENT DOCUMENTS

| | | | |
|---|---|---|---|
| 2004/0115685 A1* | 6/2004 | Tercero | C12Q 1/6834 435/6.11 |
| 2006/0166837 A1 | 7/2006 | Lin et al. | |
| 2015/0159000 A1* | 6/2015 | Rand | C09D 103/02 106/205.6 |
| 2016/0289559 A1 | 10/2016 | Madduri et al. | |
| 2017/0145282 A1 | 5/2017 | Shumway et al. | |

FOREIGN PATENT DOCUMENTS

| | | |
|---|---|---|
| WO | 2013068771 A1 | 5/2013 |
| WO | 2017065804 A1 | 4/2017 |

OTHER PUBLICATIONS

ISRWO in corresponding PCT/US2019/041346 with mail date of Oct. 29, 2019.

\* cited by examiner

*Primary Examiner* — Aiqun Li
(74) *Attorney, Agent, or Firm* — Vorys, Sater, Seymour and Pease LLP

(57) ABSTRACT

Interactions between aqueous fluids and clay-containing subterranean formations may be problematic due to issues associated with clay destabilization and migration. Functionalized dextrin compounds that are partially oxidized and bear at least one amine group at an oxidation site may promote clay stabilization for more effective treatment of a subterranean formation. Subterranean treatment methods may comprise: providing a clay stabilizing composition comprising an amine-functionalized dextrin compound, the amine-functionalized dextrin compound comprising 2 to about 20 glucose units linked together with α(1,4) glycosidic bonds, and a portion of the glucose units being oxidatively opened and functionalized with at least one amine group at a site of oxidative opening; introducing the clay stabilizing composition into a subterranean formation bearing a clay-containing mineral; and interacting the amine-functionalized dextrin compound with the clay-containing mineral to affect stabilization thereof.

22 Claims, No Drawings

AMINATED DEXTRIN COMPOUNDS AND SUBTERRANEAN TREATMENT METHODS USING THE SAME

BACKGROUND

The recovery of hydrocarbon resources, such as oil and gas, from subterranean formations containing water-sensitive minerals, such as clays, can be problematic in many instances. The crystalline structure of layered silicate clays can become mechanically unstable in the presence of water and hydraulically swell, sometimes forming a viscous fluid slurry, which may impact fluid flow within a subterranean formation and/or a wellbore penetrating the subterranean formation. Alternately, the mechanical breakdown of clays may produce fines that gradually migrate throughout the subterranean formation and wellbore. Both types of degradation are problematic due to their potential to impact fluid flow performance adversely and/or promote formation damage, thereby leading to decreased fluid permeability. Complete occlusion of fluid flow pathways or collapse of the wellbore walls may occur in some instances of excessive clay swelling or destabilization. In addition, fines migration within a wellbore, especially during production, can lead to problematic abrasion of wellbore equipment and surfaces in many instances.

Clay stabilizers are substances that may be used to limit the effect of aqueous fluids on water-sensitive clays. As used herein, the term "clay stabilizer" refers to any substance that aids in stabilizing a clay mineral against interaction with an aqueous fluid, thereby decreasing or eliminating the propensity for the clay mineral to swell and/or migrate in the form of fines. Clay stabilizers are typically disposed in a carrier fluid, usually an aqueous carrier fluid, for their interaction with a clay mineral. In many cases, clay stabilizer fluids contain inorganic salts, such as potassium chloride, which may interact with a clay surface and promote ion-exchange and dewatering of the clay structure therewith in order to increase the clay's stability. Potassium-laden clays are much less prone to swelling and fines migration compared to the native (pre-exchanged) sodium form. Consolidating agents that physically bind the clay particles together also may be suitable clay stabilizers in some instances. Suitable consolidating agents may include polymers, resins, and the like. High molecular weight polyacrylamide polymers may be used in this regard. Functionalized polysaccharide polymers have also been used for clay stabilization in some instances.

Despite the ability of inorganic salts and polymeric consolidating agents to temper the instability of clay minerals, these substances do not represent a completely satisfactory and universal approach to the problem of treating clay-containing subterranean formations with aqueous fluids. Fluids containing high concentrations of inorganic salts can be environmentally unfriendly to the wildlife and flora surrounding a drilling site, and disposal of such fluids may be problematic. In addition, high salt concentrations may impact the proper functioning of treatment fluids commonly introduced into a well bore, such as fracturing fluids and other gelled fluids. Namely, high salt concentrations may lead to improper gelation or an excessive fluid weight, which may result in improper functioning and/or placement of the treatment fluid. Polymeric consolidating agents may be expensive in certain instances, excessively increase fluid viscosity, detrimentally impact one or more other functional components of a treatment (i.e., rendering the other functional components inactive or having reduced activity), and some may present their own toxicity issues.

BRIEF DESCRIPTION OF THE DRAWINGS

Not applicable.

DETAILED DESCRIPTION

The present disclosure generally relates to clay stabilization and, more specifically, to clay stabilizing compositions and methods featuring a functionalized dextrin compound.

As discussed above, the interaction of clays with aqueous fluids may be problematic in many instances. Clay swelling and/or fines migration may occur upon interacting water-sensitive clays with aqueous fluids, which may lead to a number of undesirable subterranean outcomes, such as decreased formation permeability and surface abrasion within a wellbore. Although clay stabilizers may be utilized to mitigate deleterious interactions between aqueous fluids and water-sensitive clays, currently used clay stabilizers do not provide an entirely satisfactory approach to the problem of clay stabilization. Namely, conventional clay stabilizers may present environmental issues, particularly inorganic salts, and some may be more expensive than desirable.

The present disclosure provides a considerably different approach toward clay stabilization that utilizes much more environmentally benign and inexpensive clay stabilizers. Instead of utilizing inorganic salts or high molecular weight polymers, including polysaccharide polymers, as clay stabilizers, the present disclosure describes relatively low molecular weight saccharide oligomers that may promote effective clay stabilization, oftentimes more effectively than a much higher molecular weight polysaccharide polymer. Namely, the present disclosure describes functionalized dextrin compounds containing one or more amine groups that may provide surprising clay stabilization effects when interacted with a clay-containing mineral. More specifically, the functionalized dextrin compounds disclosed herein are produced through oxidative opening of a portion of the monosaccharide units (i.e., glucose monomers) in a dextrin parent compound, followed by reductive amination of at least one of the resulting aldehyde functionalities. Additional description of the amine-functionalized dextrin compounds and suitable functionalization methods is provided hereinbelow.

In particular embodiments, the functionalized dextrin compounds of the present disclosure may be amine-functionalized maltodextrin compounds. Amine-functionalized maltodextrin compounds can be particularly advantageous clay stabilizer materials due to the low cost of the maltodextrin parent compounds, their environmentally benign nature and low toxicity, and the readiness with which they may be functionalized through partial oxidation and reductive amination. In addition, the maltodextrin parent compounds are available in a range of oligomer sizes (e.g., 3-20 glucose monomers), which may allow some tailoring of the clay stabilization properties to be realized through choice of the dextrin chain length that undergoes amine functionalization according to the present disclosure. Additional tailoring, including tailoring to more effectively stabilize certain types of clay, may be realized through one's choice of the amine used to promote functionalization of the maltodextrin parent compound and the extent of oxidation and functionalization that takes place. Still further, the amine-functionalized maltodextrin compounds may afford stabilization of a wide range of clay-containing minerals. Both clay swelling and fines migration may be addressed using the amine-functionalized maltodextrin compounds of the present disclosure. In addition, the amine-functionalized maltodextrin compounds may favorably maintain formation integrity and matrix properties (e.g., hardness and similar features), which may aid fluid interaction during a treatment operation. As such, the amine-functionalized maltodextrin compounds disclosed herein may offer numerous advantages for promoting clay stabilization in a subterranean formation.

According to various embodiments, clay stabilizing compositions of the present disclosure may comprise an amine-functionalized dextrin compound, which comprises 2 to about 20 glucose units linked together with $\alpha(1,4)$ glycosidic bonds, and with a portion of the glucose units being oxidatively opened and functionalized with at least one amine group at a site of oxidative opening. Additional structural description of the amine-functionalized dextrin compounds follows hereinbelow.

In more specific embodiments, the amine-functionalized dextrin compounds disclosed herein may be prepared from a dextrin parent compound having 3 to about 20 monosaccharide (monomer) units that are covalently linked by $\alpha(1,4)$ glycosidic bonds. Formula 1 below shows the generic structure of a dextrin parent compound having only $\alpha(1,4)$ glycosidic bonds between adjacent glucose monomer units, wherein variable 'a' is a positive integer ranging between 1 and about 18, thereby providing a dextrin backbone with 3 to about 20 glucose monomer units.

Formula 1

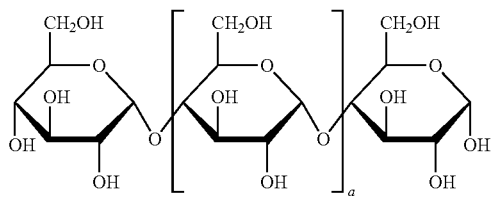

Other dextrin parent compounds may contain only $\alpha(1,6)$ glycosidic bonds, and such dextrin parent compounds may also be used to form amine-functionalized dextrin compounds suitable for use in the disclosure herein. Following partial oxidation and amine functionalization according to the disclosure herein, the glycosidic bonds are retained in the resulting amine-functionalized dextrin compound.

The dextrin parent compound may be a maltodextrin according to more specific embodiments of the present disclosure. In addition to the number of glucose monomer units that are present, maltodextrins may be characterized in terms of their dextrose equivalent (DE) value. Dextrose equivalent is a measure of the amount of reducing sugars that are present in a saccharide oligomer, particularly a dextrin, expressed as a percentage relative to dextrose. Starch, which is functionally non-reducing, has a defined dextrose equivalent of 0, whereas dextrose itself has a dextrose equivalent of 100. Higher dextrose equivalent values are characteristic of a lower number of covalently linked glucose monomers (shorter polymer backbone length). Maltodextrins suitable for undergoing functionalization according to the disclosure herein may exhibit dextrose equivalent values ranging from 3 to about 20. In more specific embodiments, dextrose equivalent values of the maltodextrins may range from about 4.5 to about 7.0, or from about 7.0 to about 10.0, or from about 9.0 to about 12.0.

Maltodextrins suitable for forming an amine-functionalized maltodextrin compound according to the disclosure herein may be obtained from hydrolysis or pyrolysis of starch, specifically the amylose component of starch, according to some embodiments. A maltodextrin having Formula 1 may be formed by hydrolysis or pyrolysis of amylose. Alternative dextrins suitable for practicing the disclosure herein may be obtained from hydrolysis or pyrolysis of the amylopectin component of starch, in which case the dextrin may contain $\alpha(1,6)$ glycosidic bonds if the dextrin is obtained through hydrolysis of the amylopectin side chain.

In some embodiments of the present disclosure, amine-functionalized dextrin compounds of the present disclosure, specifically amine-functionalized maltodextrin compounds, may be prepared by a process comprising: providing a dextrin compound comprising 3 to about 20 glucose units linked together with $\alpha(1,4)$ glycosidic bonds, reacting the dextrin compound with a periodate compound to oxidatively open a portion of the glucose units to form a dialdehyde intermediate, and reacting an amine compound with the dialdehyde intermediate under reductive amination conditions to covalently bond at least one amine group at each site of oxidative opening, the amine compound comprising a primary amine group or a secondary amine group. After completing the reductive amination reaction, at least one secondary amine group or tertiary amine group is covalently bound to the site of oxidative opening (i.e., at a carbon atom that was previously an aldehyde group). Any aldehyde groups that do not undergo amination are instead reduced to a primary alcohol under the reductive amination conditions. Any of the maltodextrins described hereinabove may represent a suitable dextrin parent compound for undergoing functionalization through sequential oxidation and reductive amination according to the disclosure herein. Amine-functionalized dextrins having $\alpha(1,6)$ glycosidic bonds may be formed through a similar process from a suitable dextrin parent compound.

Scheme 1 below shows an exemplary reaction sequence for producing an amine-functionalized maltodextrin compound according to the disclosure herein. In the interest of clarity, only a single glucose unit is shown to undergo functionalization according to Scheme 1, but it is to be appreciated that any number and arrangement of the glucose units may undergo oxidative opening and reductive amination in a manner consistent with the present disclosure. Moreover, the depicted number of glucose units in Scheme 1 is illustrative and non-limiting.

Scheme 1

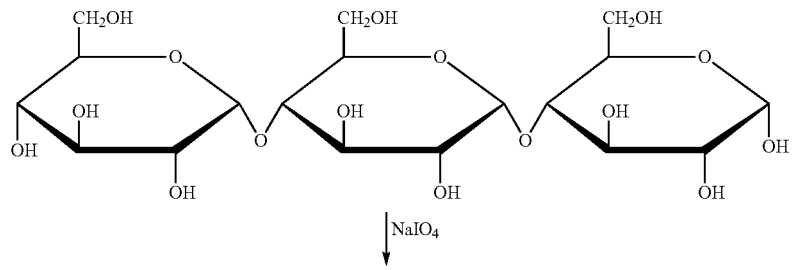

-continued

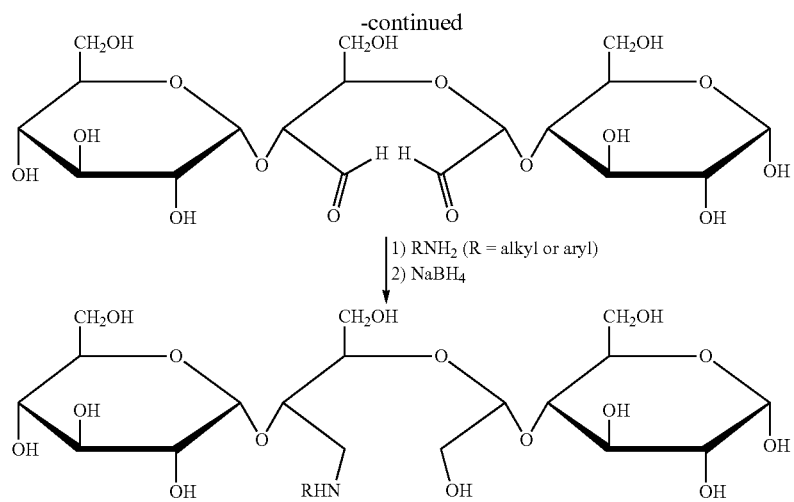

Although Scheme 1 shows the introduction of a single amine group at the site of oxidative opening, it is to be recognized that both carbon atoms at the site of oxidative opening may undergo functionalization in some instances. Likewise, other amine-functionalized dextrin compounds may be formed in a similar manner using a suitable dextrin and a suitable primary or secondary amine.

As shown in Scheme 1, a portion of the glucose units in the parent dextrin compound may undergo oxidative ring opening in the presence of a periodate compound to form a dialdehyde intermediate derived from a glucose monomer unit. The glycosidic bonds in the parent dextrin are preserved following oxidative ring opening. The periodate compound may be sodium periodate in more specific embodiments of the present disclosure. In still more specific embodiments, the periodate compound may be reacted with the parent dextrin compound in water at a temperature ranging from about −10° C. to about 25° C. Alternately, a mixture of water and a water-miscible organic solvent may be used, provided that the water-miscible organic solvent is non-reactive toward periodate.

After forming the dialdehyde intermediate, a primary amine or a secondary amine may be reacted with at least one of the aldehyde groups to form an imine intermediate (intermediate not shown in Scheme 1). Typically, the imine intermediate is not isolated, but is instead reacted in situ with a reducing agent to form a secondary amine group or a tertiary amine group that is directly covalently bound to the dextrin compound at the site of oxidative opening (i.e., at one of the former aldehyde carbon atoms). One or both of the aldehyde groups may undergo imine formation and subsequent reduction. Any aldehyde groups not undergoing imine formation and subsequent reduction to form a covalently bonded amine are instead reduced to a primary alcohol group at the site of oxidative opening. Thus, in some embodiments, the amine-functionalized dextrin compound, particularly the amine-functionalized maltodextrin compound, may bear a primary alcohol (on a first carbon atom) and a secondary amine or a tertiary amine (on a second carbon atom) at a site of oxidative opening upon the dextrin backbone. Alternately, the amine-functionalized dextrin compound may bear a secondary amine or a tertiary amine on both carbon atoms at the site of oxidative opening. In more specific embodiments, the reducing agent for conducting the reductive amination may be sodium borohydride or like mild reducing agents. The solvent for imine formation and subsequent reduction may be water or a mixture of water and an alcohol, for example, and the reactions may take place at a temperature from about −10° C. to about 25° C.

As mentioned above, suitable amines for undergoing a reaction with the dialdehyde intermediate are primary amines or secondary amines. Primary amines lead to the formation of a secondary amine following reductive amination, and secondary amines lead to the formation of a tertiary amine. Suitable amines may otherwise exhibit a variety of structures, and may be selected from entities including primary monoamines, secondary monoamines, diamines, triamines and other polyamines, amino alcohols, and the like. Particularly suitable amines may include, but are not limited to, methylamine, dimethylamine, methylethylamine, ethylamine, diethylemaine, propylamine, butylamine, hexylamine, octylamine, ethylenediamine, propylene diamine, diethylenetriamine, triethylenetetraamine, ethanolamine, and diethanolamine. When more than one amine group is present in the amine, such as in a diamine, a first amine group of the diamine may be directly covalently bound to a carbon atom at each site of oxidative opening, and a second amine group of the diamine may be unbonded to a carbon atom at the site of oxidative opening. That is, the second amine group is not directly covalently bonded to the site of oxidative opening and is instead tethered with a carbon-containing spacer group to the first amine group.

In more particular embodiments, amine-functionalized maltodextrin compounds of the present disclosure may have a structure defined by Formulas 2-4 below, in which one covalently bonded amine group is shown at each site of oxidative opening. It is to be appreciated that two covalently bonded amine groups may be present in some embodiments (structures not shown), as discussed above. Any combination of the terminal glucose units (rings A and C in Formulas 2-4) and non-terminal glucose units (ring B in Formulas 2-4) of the parent dextrin compound may undergo oxidation and amine functionalization according to the disclosure herein. Moreover, although Formulas 2-4 have shown a single oxidized glucose unit per dextrin molecule, it is to be appreciated that multiple oxidized and amine-functionalized glucose units may be present and arranged in any combination, with potential monomer positions for oxidation and functionalization being exemplified by those shown in Formulas 2-4. That is, particular amine-functionalized dextrin compounds of the present disclosure may feature an oxidized or non-oxidized A ring, any arrangement of oxidized or non-oxidized B rings (1-18 in total), and an oxidized or non-oxidized C ring, all linked together by α(1,4) glycosidic bonds.

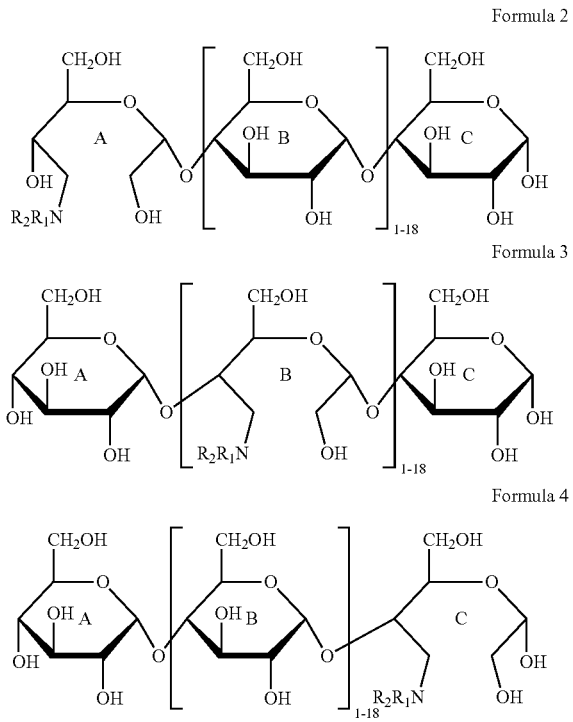

In Formulas 2-4, $R_1$ and $R_2$ may be the same or different and may be selected independently from H, alkyl, and aryl groups, with the proviso that $R_1$ and $R_2$ are not both H. According to more specific embodiments, $R_1$ and $R_2$ that are alkyl or aryl groups may be optionally substituted, particularly bearing a heteroatom functionality.

According to various embodiments, amine-functionalized dextrin compounds suitable for use in the disclosure herein may feature oxidative opening and amine functionalization upon about 5% to about 80% of the glucose monomer units. In more specific embodiments, about 10% to about 50% of the glucose monomer units in the amine-functionalized dextrin compound may be oxidatively opened and functionalized.

The amine-functionalized dextrin compounds described hereinabove may be provided, sourced, mixed, or stored in solid form or in liquid form. Liquid forms may be disposed in a suitable fluid phase. As used herein, the terms "fluid" and "fluid phase" refer to both liquids and gels, including solutions and suspensions of the amine-functionalized dextrin compounds, unless otherwise indicated. In further embodiments of the present disclosure, the clay stabilizing compositions of the present disclosure may further comprise an aqueous carrier fluid. Suitable aqueous carrier fluids may include, for example, fresh water, acidified water, seawater, brine (i.e., a saturated salt solution), or an aqueous salt solution (i.e., a non-saturated salt solution). Water-miscible organic co-solvents such as ethanol or ethylene glycol, for example, may be present in combination with an aqueous carrier fluid, in some embodiments. In certain embodiments of the present disclosure, the amine-functionalized dextrin compound may be at least partially dissolved in a salt-free aqueous carrier fluid, which may optionally further comprise a water-miscible organic co-solvent.

In some embodiments, the amine-functionalized dextrin compounds of the present disclosure, particularly amine-functionalized maltodextrin compounds, may be formulated as a subterranean treatment fluid. Treatment fluids may be used in a variety of subterranean treatment operations to facilitate or promote a particular action within the subterranean formation. As used herein, the terms "treat," "treatment," "treating," and grammatical equivalents thereof refer to any subterranean operation that uses a fluid in conjunction with achieving a desired function and/or for a desired purpose. Unless otherwise specified, use of these terms does not imply any particular action by the treatment fluid or a component thereof. Illustrative treatment operations that may be facilitated through use of the amine-functionalized dextrin compounds of the present disclosure include, without limitation, drilling operations, stimulation operations, production operations, remediation operations, sand control operations, and the like, which may include, for example, fracturing operations, gravel packing operations, acidizing operations, descaling operations, consolidation operations, workover operations, cleanup operations, and the like. Alternately, the amine-functionalized dextrin compounds of the present disclosure may be used in conjunction with subterranean operations such as, for example, excavation or mining. In particular, the amine-functionalized dextrin compounds may provide clay stabilization effects during one or more of the foregoing subterranean treatment operations. Additional disclosure directed to the use of the amine-functionalized dextrin compounds of the present disclosure in subterranean treatment operations is provided hereinbelow.

As used herein, the term "drilling operation" refers to the process of forming a wellbore in a subterranean formation. As used herein, the term "drilling fluid" refers to a fluid used in drilling a wellbore.

As used herein, the term "stimulation operation" refers to an activity conducted within a wellbore to increase production therefrom. As used herein, the term "stimulation fluid" refers to a fluid used downhole during a stimulation activity to increase production of a resource from the subterranean formation. In particular instances, stimulation fluids may include a fracturing fluid or an acidizing fluid.

As used herein, the terms "clean-up operation" or "damage control operation" refer to any operation for removing extraneous material from a wellbore to increase production. As used herein, the terms "clean-up fluid" or "damage control fluid" refer to a fluid used for removing an unwanted material from a wellbore that otherwise blocks flow of a desired fluid therethrough. In one example, a clean-up fluid can be an acidified fluid for removing material formed by one or more perforation treatments. In another example, a clean-up fluid can be used to remove a filter cake upon the wellbore walls.

As used herein, the term "fracturing operation" refers to a high pressure operation that creates or extends a plurality of flow channels within a subterranean formation. As used herein, the term "fracturing fluid" refers to a viscosified fluid used in conjunction with a fracturing operation.

As used herein, the term "remediation operation" refers to any operation designed to maintain, increase, or restore a specific rate of production from a wellbore, which may include stimulation operations or clean-up operations. As used herein, the term "remediation fluid" refers to any fluid used in conjunction with a remediation operation.

As used herein, the term "acidizing operation" refers to any operation designed to remove an acid-soluble material from a wellbore, particularly an acid-soluble material that comprises at least a portion of the subterranean formation. As used herein, the term "acidizing fluid" refers to a fluid used during an acidizing operation.

As used herein, the term "spotting fluid" refers to a fluid designed for localized treatment of a subterranean formation. In one example, a spotting fluid can include a lost circulation material for treatment of a specific section of the wellbore, such as to seal off fractures in the wellbore and prevent sag. In another example, a spotting fluid can include a water control material or material designed to free a stuck piece of drilling or extraction equipment.

As used herein, the term "completion fluid" refers to a fluid used during the completion phase of a wellbore, including cementing compositions and cementing fluids.

As used herein, the term "cementing fluid" refers to a fluid used during cementing operations within a wellbore of a well.

The amine-functionalized dextrin compounds of the present disclosure may be present in any of the treatment fluids discussed above. The amine-functionalized dextrin compounds may promote clay stabilization effects when disposed in the treatment fluids.

Treatment fluids of the present disclosure may feature a concentration of the amine-functionalized dextrin compound ranging from about 0.1 gallons per thousand gallons (gpt) to about 10 gpt, or from about 0.5 gpt to about 5 gpt, or from about 1 gpt to about 3 gpt. These concentrations correspond to volume/volume percentages ranging from about 0.01% to about 1%, or from about 0.05% to about 0.5%, or from about 0.1% to about 0.3%. The chosen concentration may vary depending upon the particular requirements for a given treatment operation and/or the specific subterranean conditions that are encountered downhole.

Treatment fluids containing the amine-functionalized dextrin compounds of the present disclosure may optionally further comprise any number of additives, particularly those that are commonly used in the oilfield services industry. Illustrative additives that may be present in combination with the amine-functionalized dextrin compounds of the present disclosure include, for example, surfactants, viscosifiers, gelling agents, gel stabilizers, anti-oxidants, polymer degradation prevention additives, relative permeability modifiers, scale inhibitors, corrosion inhibitors, chelating agents, foaming agents, defoaming agents, antifoaming agents, emulsifying agents, de-emulsifying agents, iron control agents, proppants or other particulates, particulate diverters, salts, acids, fluid loss control additives, gas, catalysts, other clay control agents, dispersants, flocculants, scavengers (e.g., $H_2S$ scavengers, $CO_2$ scavengers or $O_2$ scavengers), lubricants, breakers, friction reducers, bridging agents, weighting agents, solubilizers, pH control agents (e.g., buffers), hydrate inhibitors, consolidating agents, bactericides, catalysts, the like, and any combination thereof. Suitable examples of these additives will be familiar to one having ordinary skill in the art.

As referenced above, the amine-functionalized dextrin compounds of the present disclosure may be used in various subterranean treatment operations to promote clay control or clay stabilization. Promoting clay control or clay stabilization may include one or more of limiting clay swelling or migration of clay fines compared to that observed when water or a similarly unmodified aqueous fluid interacts with a clay mineral. In more particular embodiments, clay stabilization methods of the present disclosure may comprise: providing a clay stabilizing composition comprising an amine-functionalized dextrin compound, the amine-functionalized dextrin compound comprising 2 to about 20 glucose units linked together with $\alpha(1,4)$ glycosidic bonds, and a portion of the glucose units being oxidatively opened and functionalized with at least one amine group at a site of oxidative opening; introducing the clay stabilizing composition into a subterranean formation bearing a clay-containing mineral; and interacting the amine-functionalized dextrin compound with the clay-containing mineral to affect stabilization thereof. The amine-functionalized dextrin compound may promote clay stabilization during any of the subterranean treatment operations listed above.

In more specific embodiments, the amine-functionalized dextrin compound may be disposed in an aqueous carrier fluid when introduced into the subterranean formation. Suitable aqueous carrier fluids are discussed in more detail above. The aqueous carrier fluid may be introduced into the subterranean formation at matrix flow rates or at a flow rate such that the fracture gradient pressure of the subterranean formation is exceeded.

The amine-functionalized dextrin compounds of the present disclosure have applicability toward stabilizing a wide range of clays, which may be present in various types of subterranean formations. The subterranean formations may contain a clay layer or include a clay-containing mineral. In more specific embodiments, the subterranean formation undergoing clay stabilization according to the present disclosure may be a shale formation. The amine-functionalized dextrin compounds may exhibit a range of clay stabilization effects, depending upon the nature of shale formation undergoing treatment and the type of clay(s) present therein.

Types of clay that may be stabilized with the amine-functionalized dextrin compounds of the present disclosure include both swelling and non-swelling clays. Specific examples of clays that may be stabilized with the amine-functionalized dextrin compounds of the present disclosure include, for example, illite, smectite, mixed illite/smectite, kaolinite, nacrite, dickite, halloysite, chlorite, chamosite, muscovite, biotite, hydrobiotite, talc, glauconite, sepiolite, montmorillonite, nontronite, hectorite, sauconite, saponite, beidellite, nactrite, endellite, greenosite, palygorskite, vermiculite, and/or attapulgite.

In some embodiments, clay stabilization may be characterized in terms of the capillary suction time observed for a given shale or clay mineral. A decrease in capillary suction time following treatment with the amine-functionalized dextrin compound is characteristic of clay stabilization. In some specific examples, the clay stabilizing compositions may decrease capillary suction times by about 10% to about 55% relative to the capillary suction time observed for a given shale or clay mineral that has been contacted with an unmodified aqueous fluid lacking a clay stabilizer.

Clay stabilization may also be characterized in terms of the amount of fines produced for a given shale or clay mineral when contacting an aqueous fluid. Effective clay stabilization is characterized by a decreased amount of fines produced for a given shale or clay mineral relative to that produced when the shale or clay mineral has contacted an unmodified aqueous fluid.

In some embodiments, introducing the clay stabilizing composition into the subterranean formation may include contacting or placing the amine-functionalized dextrin compound within or upon at least one fracture, an area surrounding a fracture, an area designated for fracturing, a flow pathway, an area surrounding a flow pathway, a wellbore surface, and/or a near wellbore surface. Contacting or placing the clay stabilizing composition may involve suitable fluid diversion techniques in some embodiments.

In some embodiments, the clay stabilizing compositions may be incorporated in a primary treatment fluid introduced into a subterranean formation. In other embodiments, the clay stabilizing compositions may be incorporated within a fluid pill introduced before a primary treatment fluid or between two primary treatment fluids. In some or other embodiments, introducing the clay stabilizing compositions into the subterranean formation may take place during drilling (i.e., in a drilling fluid) or during completion (e.g., in a cementing fluid).

In some embodiments, the clay stabilizing compositions may be introduced into the subterranean formation in conjunction with a hydraulic fracturing operation. The fracturing operation may create or extend at least one fracture or flow pathway within the subterranean formation. Introducing or placing the clay stabilizing compositions in the subterranean formation and the hydraulic fracturing operation may occur at any time with respect to one another. In some embodiments, the clay stabilizing compositions may be present within the fracturing fluid, such that clay stabilization occurs concurrently with or after fracturing. In other embodiments, the clay stabilizing compositions may be present in a pad fluid introduced into the subterranean formation before the primary fracturing fluid. The primary fracturing fluid may contain a proppant for maintaining the fractures open, whereas the pad fluid generally does not contain proppant.

In some or other embodiments, the clay stabilizing compositions may be present in an acidizing fluid. Such acidizing fluids may include mineral acids or organic acids. Mineral acids may include acids such as hydrochloric acid, hydrobromic acid, or hydrofluoric acid, for example. Organic acids may include, for example, formic acid, acetic acid, trifluoroacetic acid, methanesulfonic acid, or trifluoromethane sulfonic acid. Sufficient amounts of the chosen acid may be present in the acidizing fluid to affect dissolution of an acid-soluble material in a subterranean formation or wellbore.

Embodiments disclosed herein include:

A. Clay stabilizing compositions. The clay stabilizing compositions comprise: an amine-functionalized dextrin compound, the amine-functionalized dextrin compound comprising 2 to about 20 glucose units linked together with $\alpha(1,4)$ glycosidic bonds, and a portion of the glucose units being oxidatively opened and functionalized with at least one amine group at a site of oxidative opening.

B. Subterranean treatment methods. The methods comprise: providing a clay stabilizing composition comprising an amine-functionalized dextrin compound, the amine-functionalized dextrin compound comprising 2 to about 20 glucose units linked together with $\alpha(1,4)$ glycosidic bonds, and a portion of the glucose units being oxidatively opened and functionalized with at least one amine group at a site of oxidative opening; introducing the clay stabilizing composition into a subterranean formation bearing a clay-containing mineral; and interacting the amine-functionalized dextrin compound with the clay-containing mineral to affect stabilization thereof.

C. Methods for functionalizing a dextrin compound. The methods comprise: providing a dextrin compound in an aqueous fluid, the dextrin compound comprising 2 to about 20 glucose units linked together with $\alpha(1,4)$ glycosidic bonds; reacting the dextrin compound with a periodate compound to oxidatively open a portion of the glucose units to form a dialdehyde intermediate; and reacting an amine compound with the dialdehyde intermediate under reductive amination conditions to covalently bond at least one amine group at each site of oxidative opening, the amine compound comprising a primary amine group or a secondary amine group.

Embodiments A-C may have one or more of the following additional elements in any combination.

Element 1: wherein the amine-functionalized dextrin compound is an amine-functionalized maltodextrin compound.

Element 2: wherein the amine-functionalized maltodextrin compound is formed from a maltodextrin having a dextrose equivalent value of about 3 to about 20.

Element 3: wherein the amine-functionalized maltodextrin compound is formed from a maltodextrin having a dextrose equivalent value of about 4.5-7.0.

Element 4: wherein the amine-functionalized maltodextrin compound is formed from a maltodextrin having a dextrose equivalent value of about 9.0-12.0.

Element 5: wherein the composition further comprises an aqueous carrier fluid.

Element 6: wherein the amine-functionalized dextrin compound bears a secondary amine or a tertiary amine that is directly covalently bound to each site of oxidative opening.

Element 7: wherein the amine-functionalized dextrin compound bears a primary alcohol and the secondary amine or the tertiary amine at each site of oxidative opening.

Element 8: wherein a diamine is covalently bound to each site of oxidative opening, a first amine group of the diamine being directly covalently bound to the site of oxidative opening, and a second amine group of the diamine being tethered to the site of oxidative opening.

Element 9: wherein the diamine is ethylenediamine.

Element 10: wherein the amine-functionalized dextrin compound is disposed in an aqueous carrier fluid when introduced into the subterranean formation.

Element 11: wherein the subterranean formation is a shale formation.

By way of non-limiting example, exemplary combinations applicable to A-C include: 1 and 2; 1 and 3; 1 and 4; 1 and 5; 1 and 6; 1 and 7; 1 and 8; 1, 8 and 9; 1-3; 1, 2 and 4; 1, 2 and 5; 1, 2 and 6; 1, 2 and 7; 1, 2 and 8; 1, 2, 8 and 9; 2 and 5; 2 and 6; 2 and 7; 2 and 8; 2, 8 and 9; 5 and 6; 5 and 7; 5 and 8; 5, 8 and 9; 6 and 7; 6 and 8; 6, 8 and 9; 7 and 8; 7-9; and 8-9. By way of further non-limiting example, exemplary combinations applicable to B include: 10 and/or 11 in further combination with 1 and 2; 1 and 3; 1 and 4; 1 and 5; 1 and 6; 1 and 7; 1 and 8; 1, 8 and 9; 1-3; 1, 2 and 4; 1, 2 and 5; 1, 2 and 6; 1, 2 and 7; 1, 2 and 8; 1, 2, 8 and 9; 2 and 5; 2 and 6; 2 and 7; 2 and 8; 2, 8 and 9; 5 and 6; 5 and 7; 5 and 8; 5, 8 and 9; 6 and 7; 6 and 8; 6, 8 and 9; 7 and 8; 7-9; or 8-9. Additional exemplary combinations applicable to B include: 1 and 10; 1, 10 and 11; 1 and 11; 2 and 10; 2, 10 and 11; 2 and 11; 6 and 10; 6 and 11; 6, 10 and 11; 7 and 10; 7 and 11; 7, 10 and 11; 8 and 10; 8 and 11; 8, 10 and 11; 8-10; 8, 9 and 11; 8-11; and 10 and 11.

To facilitate a better understanding of the disclosure herein, the following examples of various representative embodiments are given. In no way should the following examples be read to limit, or to define, the scope of the invention.

EXAMPLES

Example 1: Preparation of amine-functionalized dextran. Dextran was reacted with sodium periodate in water at room temperature (about 20° C.-22° C.) to oxidatively open a portion (~10%) of the glucose monosaccharide units in the polymer chain. To the resulting dialdehyde was then added ethylenediamine in water at room temperature, and the intermediate imine was then reacted with sodium borohydride, again in water and at room temperature. The product was used directly in the aqueous solution without further purification.

Example 2: Preparation of amine-functionalized maltodextrin. Amine-functionalized maltodextrin was prepared in a similar manner to the amine-functionalized dextran of Example 1, except substituting maltodextrin for dextran. The extent of oxidation was again approximately 10%. Two different maltodextrin products were used (MALTRIN M100 having an average dextrose equivalent value of 9.0-12.0 and MALTRIN M040 having an average dextrose equivalent value of 4.5-7.0, both of which are available from Grain Processing Corporation, Muscatine, Iowa). The product was used directly in the aqueous solution without further purification.

Example 3: Capillary Suction Testing. The amine-functionalized dextran (AF dextran) and amine-functionalized maltodextrin (AF maltodextrin) from Examples 1 and 2 were subjected to capillary suction testing in the presence of various shales and clay materials. Testing results are summarized in Table 1. The amine-functionalized maltodextrin was synthesized from MALTRIN 040.

Capillary suction testing was performed in the following manner. A thick paper filter (usually Whatman 17 or equivalent) was sandwiched between two rectangular blocks of clear plastic. A hollow cylinder was placed on top of the paper filter at the center of the upper plastic block and was used as a sludge reservoir. Concentric circles are placed around the sludge reservoir. Two sensors are placed on the first concentric circle (first and second sensors), and a single (third) sensor is placed on the second concentric circle. The first concentric circle is surrounded by the second concentric circle. The three sensors are electrically connected to a counter.

The sludge reservoir (cylinder diameter=10 mm or 18 mm depending on sludge filtrability) was filled with a representative amount of control material or shale sludge. After the cylinder has been filled with the sludge, the filtrate gradually spreads on the filter paper and out of the cylinder under the action of capillary suction. The rate at which the filtrate ring spreads concentrically in relation to the area covered by the sludge depends on the quality of the paper filter and the sludge filtration capability. When the filtrate ring reaches the first concentric circle, the increased conductivity between the two sensors (first and second sensors) initiates the counter. When the filtrate ring reaches the second concentric circle, a similar change in conductivity between the third sensor on the second concentric circle and one of the sensors upon the first concentric circle stops the counter. The time the counter runs is reported as the capillary suction time.

TABLE 1

| | Capillary Suction Time (CST) In Seconds (CST Ratio With Respect to Control) | | | | |
|---|---|---|---|---|---|
| | Montney Shale | Eagle Ford Shale | Bentonite Clay | TTR Shale[1] | No Shale |
| 1 gpt | | | | | |
| AF dextran | 14.6 (0.96) | 19.8 (0.69) | 285.7 (0.92) | 25.3 (0.57) | — |
| AF maltodextrin | 13.2 (0.87) | 17.3 (0.61) | 182.0 (0.58) | 25.6 (0.58) | — |
| 2 gpt | | | | | |
| AF dextran | 14.5 (0.95) | 18.4 (0.65) | 225.1 (0.72) | 25.6 (0.58) | — |
| AF maltodextrin | 13.5 (0.89) | 17.7 (0.62) | 147.5 (0.47) | 29.9 (0.67) | 7.3 (0.95) |
| Control | | | | | |
| Water | 15.2 | 28.5 | 311.9 | 44.4 | 7.7 |

[1]TTR Shale = Texas Tertiary Reactive Shale

As shown in Table 1, the amine-functionalized maltodextrin compound outperformed the corresponding amine-functionalized dextran polymer in three of the four shale or clay materials tested. The one exception was TTR shale, in which the amine-functionalized dextran polymer performed slightly better at both 1 gpt and 2 gpt concentrations.

Example 4: Roller Oven Test. The amine-functionalized dextran polymer and the amine-functionalized maltodextrin compound from Examples 1 and 2 were subjected to roller oven testing to determine production of total fines from Montney Shale and Eagle Ford Shale. Fines production was compared against 70% choline chloride and carboxymethylcellulose controls (FINNFIX 10, CP Kelco). Testing results are shown in Table 2.

Roller oven testing was performed in the following manner. A granulated shale sample was weighed and then exposed to the fluid to be tested for one hour. The sample was then rolled for sixteen hours at 150° F. The sample material was then screened using −40/+70 mesh sizing and the resultant weight loss was recorded. The sample weight loss corresponds to the amount of fines produced.

TABLE 2

| | Wt. % Fines Generated During Roller Oven Testing | |
|---|---|---|
| | Montney Shale | Eagle Ford Shale |
| 1 gpt | | |
| AF dextran[2] | 16.11 | 5.80 |
| AF maltodextrin (DE = 9-12) | 15.82 | 6.08 |
| AF maltodextrin (DE = 4.5-7) | 16.94 | 6.44 |
| 70% choline chloride | 16.98 | 5.60 |
| FINNFIX 10 | 15.92 | 5.94 |
| 2 gpt | | |
| AF dextran[2] | 15.72 | 5.34 |
| AF maltodextrin (DE = 9-12) | 16.70 | 4.86 |
| AF maltodextrin (DE = 4.5-7) | 15.16 | 5.64 |
| 70% choline chloride | 17.26 | 5.84 |
| FINNFIX 10 | 15.66 | 5.70 |

[2]Average of three lots

As shown in Table 2, the performance of the amine-functionalized dextran polymer and amine-functionalized maltodextrin compound varied between different shales, with the performance also varying with concentration. Despite the variability, the performance of at least one variant of the amine-functionalized maltodextrin compounds exceeded that of the standards and the amine-functionalized dextran polymer at least at one concentration. As shown, 2 gpt of the amine-functionalized maltodextrin compound having a DE of 4.5-7 produced the best performance of all the tested materials for Montney Shale. In contrast, the best performance for Eagle Ford Shale was observed for 2 gpt of the amine-functionalized maltodextrin compound having a DE of 9-12.

Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating various features are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While various systems, tools and methods are described herein in terms of "comprising" various components or steps, the systems, tools and methods can also "consist essentially of" or "consist of" the various components and steps.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Therefore, the disclosed systems, tools and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, tools and methods illustratively disclosed herein may suitably be practiced in the absence of any element that is not specifically disclosed herein and/or any optional element disclosed herein. While systems, tools and methods are described in terms of "comprising," "containing," or "including" various components or steps, the systems, tools and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is the following:

1. A clay stabilizing composition comprising:
   an amine-functionalized dextrin compound, the amine-functionalized dextrin compound comprising 2 to about 20 glucose units linked together with $\alpha(1,4)$ glycosidic bonds, and a portion of the glucose units being oxidatively opened and functionalized with at least one amine group at a site of oxidative opening.

2. The clay stabilizing composition of claim 1, wherein the amine-functionalized dextrin compound is an amine-functionalized maltodextrin compound.

3. The clay stabilizing composition of claim 2, wherein the amine-functionalized maltodextrin compound is formed from a maltodextrin having a dextrose equivalent value of about 3 to about 20.

4. The clay stabilizing composition of claim 3, wherein the amine-functionalized maltodextrin compound is formed from a maltodextrin having a dextrose equivalent value of about 4.5-7.0.

5. The clay stabilizing composition of claim 3, wherein the amine-functionalized maltodextrin compound is formed from a maltodextrin having a dextrose equivalent value of about 9.0-12.0.

6. The clay stabilizing composition of claim 1, further comprising:
   an aqueous carrier fluid.

7. The clay stabilizing composition of claim 1, wherein the amine-functionalized dextrin compound bears a secondary amine or a tertiary amine that is directly covalently bound to each site of oxidative opening.

8. The clay stabilizing composition of claim 7, wherein the amine-functionalized dextrin compound bears a primary alcohol and the secondary amine or the tertiary amine at each site of oxidative opening.

9. The clay stabilizing composition of claim 7, wherein a diamine is covalently bound to each site of oxidative opening, a first amine group of the diamine being directly covalently bound to the site of oxidative opening, and a second amine group of the diamine being tethered to the site of oxidative opening.

10. The clay stabilizing composition of claim 9, wherein the diamine is ethylenediamine.

11. A method comprising:
    providing a clay stabilizing composition comprising an amine-functionalized dextrin compound, the amine-functionalized dextrin compound comprising 2 to about 20 glucose units linked together with $\alpha(1,4)$ glycosidic bonds, and a portion of the glucose units being oxidatively opened and functionalized with at least one amine group at a site of oxidative opening;

introducing the clay stabilizing composition into a subterranean formation bearing a clay-containing mineral; and interacting the amine-functionalized dextrin compound with the clay-containing mineral to affect stabilization thereof.

12. The method of claim 11, wherein the amine-functionalized dextrin compound is disposed in an aqueous carrier fluid when introduced into the subterranean formation.

13. The method of claim 11, wherein the subterranean formation is a shale formation.

14. The method of claim 11, wherein the amine-functionalized dextrin compound is an amine-functionalized maltodextrin compound.

15. The method of claim 14, wherein the amine-functionalized maltodextrin compound is formed from a maltodextrin having a dextrose equivalent value of about 3 to about 20.

16. The method of claim 15, wherein the amine-functionalized maltodextrin compound is formed from a maltodextrin having a dextrose equivalent value of about 4.5-7.0.

17. The method of claim 15, wherein the amine-functionalized maltodextrin compound is formed from a maltodextrin having a dextrose equivalent value of about 9.0-12.0.

18. The method of claim 11, wherein the amine-functionalized dextrin compound bears a secondary amine or a tertiary amine that is directly covalently bound to each site of oxidative opening.

19. The method of claim 18, wherein the amine-functionalized dextrin compound bears a primary alcohol and the secondary amine or the tertiary amine at each site of oxidative opening.

20. The method of claim 18, wherein a diamine is covalently bound to each site of oxidative opening, a first amine group of the diamine being directly covalently bound to the site of oxidative opening, and a second amine group of the diamine being tethered to the site of oxidative opening.

21. The method of claim 20, wherein the diamine is ethylenediamine.

22. A method comprising:

providing a dextrin compound in an aqueous fluid, the dextrin compound comprising 2 to about 20 glucose units linked together with α(1,4) glycosidic bonds;

reacting the dextrin compound with a periodate compound to oxidatively open a portion of the glucose units to form a dialdehyde intermediate; and reacting an amine compound with the dialdehyde intermediate under reductive amination conditions to covalently bond at least one amine group at each site of oxidative opening, the amine compound comprising a primary amine group or a secondary amine group.

* * * * *